(12) United States Patent
Hussain

(10) Patent No.: US 8,595,473 B2
(45) Date of Patent: Nov. 26, 2013

(54) METHOD AND APPARATUS FOR PERFORMING CONTROL OF FLOW IN A GRAPHICS PROCESSOR ARCHITECTURE

(75) Inventor: Zahid Hussain, Berkshire (GB)

(73) Assignee: Via Technologies, Inc., Hsin-Tien, Taipei (TW)

( * ) Notice: Subject to any disclaimer, the term of this patent is extended or adjusted under 35 U.S.C. 154(b) by 603 days.

(21) Appl. No.: 12/904,199

(22) Filed: Oct. 14, 2010

(65) Prior Publication Data
US 2012/0096242 A1  Apr. 19, 2012

(51) Int. Cl.
*G06F 9/00* (2006.01)

(52) U.S. Cl.
USPC .......................................................... 712/236

(58) Field of Classification Search
None
See application file for complete search history.

(56) References Cited

U.S. PATENT DOCUMENTS

| | | | |
|---|---|---|---|
| 6,542,989 B2 * | 4/2003 | Duranton | 712/225 |
| 6,574,728 B1 * | 6/2003 | Chayut | 712/234 |

* cited by examiner

*Primary Examiner* — Andrew Caldwell
*Assistant Examiner* — Benjamin Geib
(74) *Attorney, Agent, or Firm* — McClure, Qualey & Rodack, LLP

(57) ABSTRACT

Methods and systems for performing control of flow in a graphics processor architecture are provided. For example, in at least one embodiment, a computing system includes a memory storing a plurality of instructions and a graphics processing unit. The graphics processing unit is configured to process the instructions according to a multi-stage scalar pipeline and store condition code values in the branch control stack. The graphics processing unit is further configured to process branch instructions using condition code values stored in the condition register at the top of the branch control stack.

17 Claims, 8 Drawing Sheets

METHOD AND APPARATUS FOR PERFORMING CONTROL OF FLOW IN A GRAPHICS PROCESSOR ARCHITECTURE

COPYRIGHT NOTICE

A portion of the disclosure of this patent document contains material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present disclosure is generally related to computers and, more particularly, is related to performing control of flow in a graphics processor architecture.

DESCRIPTION OF THE RELATED ART

Computers often use processors to execute instructions included in a program. Over time, processors have improved and are able to operate at higher frequencies and, thus, execute instructions more quickly. However, the number of instructions included in programs have also increased as well, and operating at higher frequencies requires higher operating voltages and, hence, more power.

SUMMARY

Embodiments of the present disclosure provide methods and systems for performing control of flow in a graphics processor architecture. For example, in at least one embodiment, among others, a method includes executing a first instruction at a first stage in a scalar pipeline using a graphics processing unit to generate a first condition code value. The first instruction includes a first stack operation indicator. The method further includes performing a stack operation on a branch control stack based on the stack operation indicator and decoding a branch instruction. The method also includes determining whether to branch to the target instruction based on the branch instruction and at least one condition code value stored in the branch control stack. Additionally, responsive to determining to branch to the target instruction, the method includes updating a program counter value to include the instruction address of the target instruction.

As another example, in at least one embodiment, among others, a method includes executing a plurality of instructions in a multi-stage scalar pipeline using a graphics processing unit. One of the instructions generates a condition code value. The method further includes pushing the condition code value onto a branch control stack. The condition code value is generated during one of the stages of execution of one of the plurality of instructions in the scalar pipeline. Also, the method includes processing a branch instruction, using a graphics processing unit, based at least in part on a condition code value read from the branch control stack.

As yet another example, in at least one embodiment, among others, a computing system includes a memory storing a plurality of instructions and a graphics processing unit. The graphics processing unit is configured to process the instructions according to a multi-stage scalar pipeline and store condition code values in the branch control stack. The graphics processing unit is further configured to process branch instructions using condition code values stored in the condition register at the top of the branch control stack.

Other systems, methods, features, and advantages of the present disclosure will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure generally relates to controlling of the flow of instructions executed by a processor in a computing system. For example, the processor executes the instructions of a program according to a multi-stage pipeline. The processor typically executes the instructions in sequence, but the order of the instructions can be altered by special instructions called branch instructions. A branch instruction may change the flow by branching (jumping) to a target instruction, which is different from the next instruction in sequence in the program. The processor branches to the target instruction depending on whether certain conditions specified by the branch instruction are true. The processor evaluates the conditions by performing Boolean operations specified by the branch instruction on condition code values that are stored in a branch control stack.

The condition code values are generated during the execution of previous instructions in the program, and each condition code value is pushed onto or popped off the top of the branch control stack as indicated by the instruction that generated the condition code value. Pushing a condition code value onto the branch control stack concerns moving each of the values previously stored in the branch control stack to lower positions and storing the condition code value in the position at the top of the branch control stack. Similarly, popping a condition code value off the branch control stack concerns reading and removing the condition code value stored at the top of the branch control stack and moving each of the other values stored in the branch control stack to higher positions. The condition code value stored at the top of the stack is accessible via a pointer, and when a branch instruction is processed, one or more of the conditional code values stored at the top of the branch control stack are popped off and used in determining whether to branch to the target instruction.

By enabling the condition code values to be accessible via a pointer and manipulated by stack operations, accessing the condition code values based on a register address can be avoided. For programs including branch instructions where many conditions must be evaluated, using the branch control stack may reduce power consumption, lower voltage and/or frequency requirements since the general purpose registers do not have to be accessed to obtain each condition code value and no address decoding for those the general purpose registers is necessary. This embodiment and other embodiments will be discussed in further detail below with respect to the figures.

Figure 1:
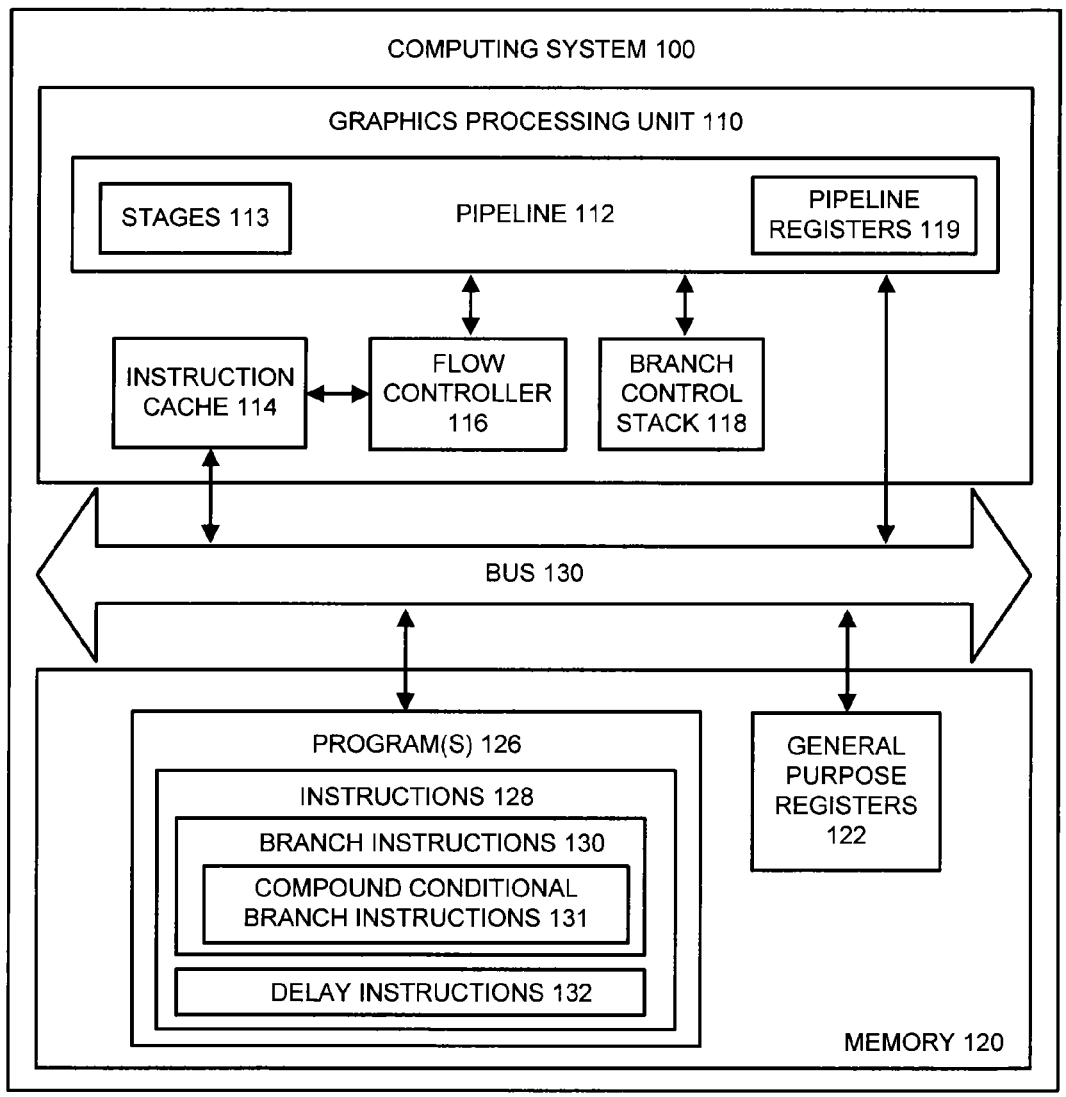
FIG. 1 is a block diagram illustrating an embodiment of a computing system.

FIG. 1 is a block diagram illustrating an embodiment of a computing system 100 according to an embodiment of the present disclosure. In the embodiment illustrated in FIG. 1, the computing system 100 includes a graphics processing unit (GPU) 110 in communication with a memory 120 via a bus 130. Generally speaking, the computing system 100 in FIG. 1 may comprise any one of a wide variety of wired and/or wireless computing devices, such as a desktop computer, portable computer, dedicated server computer, multiprocessor computing device, and so forth.

In addition to the GPU 110 and memory 120, the computing system 100 may further comprise a number of input/output interfaces, a network interface, a display, and mass storage, wherein each of these devices are connected across the bus 130. The GPU 110 can include any custom made or commercially available processor, an auxiliary processor among several processors associated with the computing system 100, a semiconductor based microprocessor, one or more application specific integrated circuits (ASICs), a plurality of suitably configured digital logic gates, and other well known electrical configurations comprising discrete elements both individually and in various combinations to coordinate the overall operation of the computing system 100.

The memory 120 can include any one or a combination of volatile memory elements (e.g., random-access memory (RAM, such as DRAM, and SRAM, etc.)) and nonvolatile memory elements (e.g., ROM, hard drive, CDROM, etc.). The memory 120 typically comprises a native operating system, one or more native applications, emulation systems, or emulated applications for any of a variety of operating systems and/or emulated hardware platforms, emulated operating systems, etc. One of ordinary skill in the art will appreciate that the memory 120 can, and typically will, comprise other components which have been omitted for purposes of brevity. The input/output interfaces described above provide any number of interfaces for the input and output of data. For example, where the computing system 100 comprises a personal computer, these components may interface with a user input device, which may be a keyboard or a mouse.

Where any of the components described above comprises software, the components may be embodied in a tangible medium such as a computer-readable medium and executed by the GPU 110 or another processor in the computing system 100 or other system. In the context of the present disclosure, a computer-readable medium can be any tangible medium that can contain, store, or maintain the software or code for use by or in connection with an instruction execution system. For example, a computer-readable medium may store one or more programs for execution by the GPU 110 described above. The computer readable medium can be, for example, but not limited to, an electronic, magnetic, optical, electromagnetic, infrared, or semiconductor system, system, or device. More specific examples of the computer-readable medium may include the following: an electrical connection having one or more wires, a portable computer diskette, a random access memory (RAM), a read-only memory (ROM), an erasable programmable read-only memory (EPROM, EEPROM, or Flash memory), and a portable compact disc read-only memory (CDROM). Additionally, the computing system 100 may include a network interface that comprises a device that can communicate with both inputs and outputs, for instance, a modulator/demodulator (e.g., a modem), wireless (e.g., radio frequency (RF)) transceiver, a telephonic interface, a bridge, a router, network card, etc.).

As illustrated in the embodiment in FIG. 1, the memory 120 includes general purpose registers 122 and one or more program(s) 126 including instructions 128, branch instructions 130, compound conditional branch instructions 131, and branch delay instructions 132 (e.g., no-operation (NOP) instructions). Further, the GPU 110 includes a pipeline 112, an instruction cache 114, a flow controller 116, and a branch control stack ("stack") 118. The instruction cache 114 stores one or more instructions 128 temporarily to make the one or more instructions 128 quickly accessible to the pipeline 112.

Pipelining allows the GPU 110 to increase the number of instructions 128 that can be executed per a unit of time. Pipelining involves splitting the processing of an instruction 128 into a series of independent stages 113, with storage of a result and a status in pipeline registers 119 at the end of each stage 113. So, instead of executing one instruction 128 at a time, multiple instructions 128 are executed simultaneously but at different stages 113.

Figure 2:
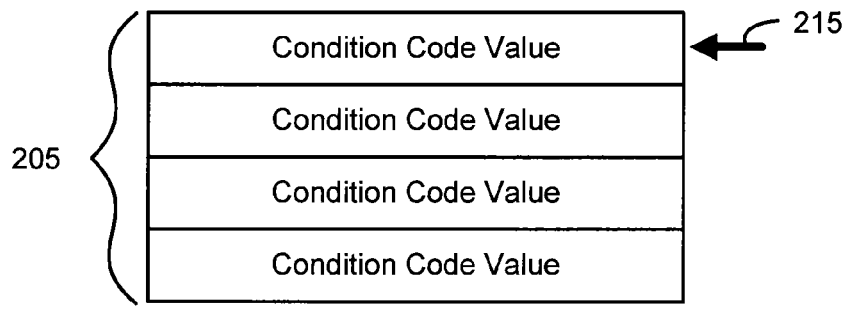
FIG. 2 is a block diagram illustrating a nonlimiting example of the branch control stack of the computing system illustrated in FIG. 1.

FIG. 2 illustrates a nonlimiting example of the stack 118 of the embodiment of the computing system 100 of FIG. 1. The stack 118 stores condition code values 205, which includes four bits and indicates the status of a branch condition. The condition code value 205 stored at the top of the stack 118 is accessible via a pointer 215. Also, the stack 118 can be manipulated by stack operations (e.g., POP, PUSH, POP AND PUSH operations). Further, the stack 118 operates on a last in first out (LIFO) basis such that the last condition code value 205 pushed onto the stack 118 is the first condition code value 205 popped off the stack 118.

Figure 3:
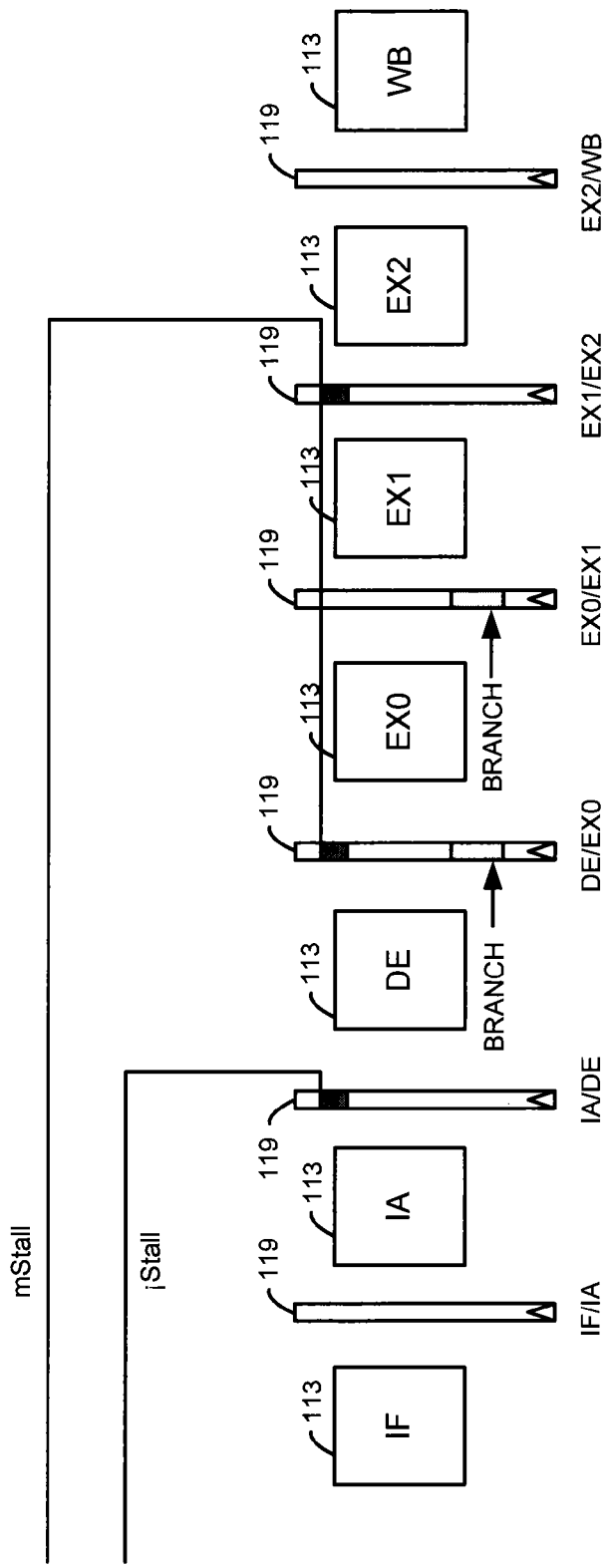
FIG. 3 is a block diagram illustrating a nonlimiting example of the pipeline of the computing system illustrated in FIG. 1.

FIG. 3 is a block diagram illustrating a nonlimiting example of the pipeline 112 in the computing system 100 of FIG. 1. The pipeline 112 illustrated in FIG. 3 includes seven stages 113: an instruction fetch stage IF, an instruction address stage IA, a decode stage DE, an execution stage EX0, an execution stage EX1, an execution stage EX2, and a write back stage WB. In other embodiments, the pipeline 112 includes more or fewer stages 113. In some embodiments, lock and stall mechanisms are employed to execute the pipeline 112. A condition code value 205 is produced by an instruction 128 after an execution stage 213, 214, 215. In some embodiments, different instructions 128 produce condition code values at different stages 113 in the pipeline 112. In some embodiments, such as the one illustrated in FIG. 3, pipeline registers 119 store the results generated by the execution of the instructions 128.

Figure 4:
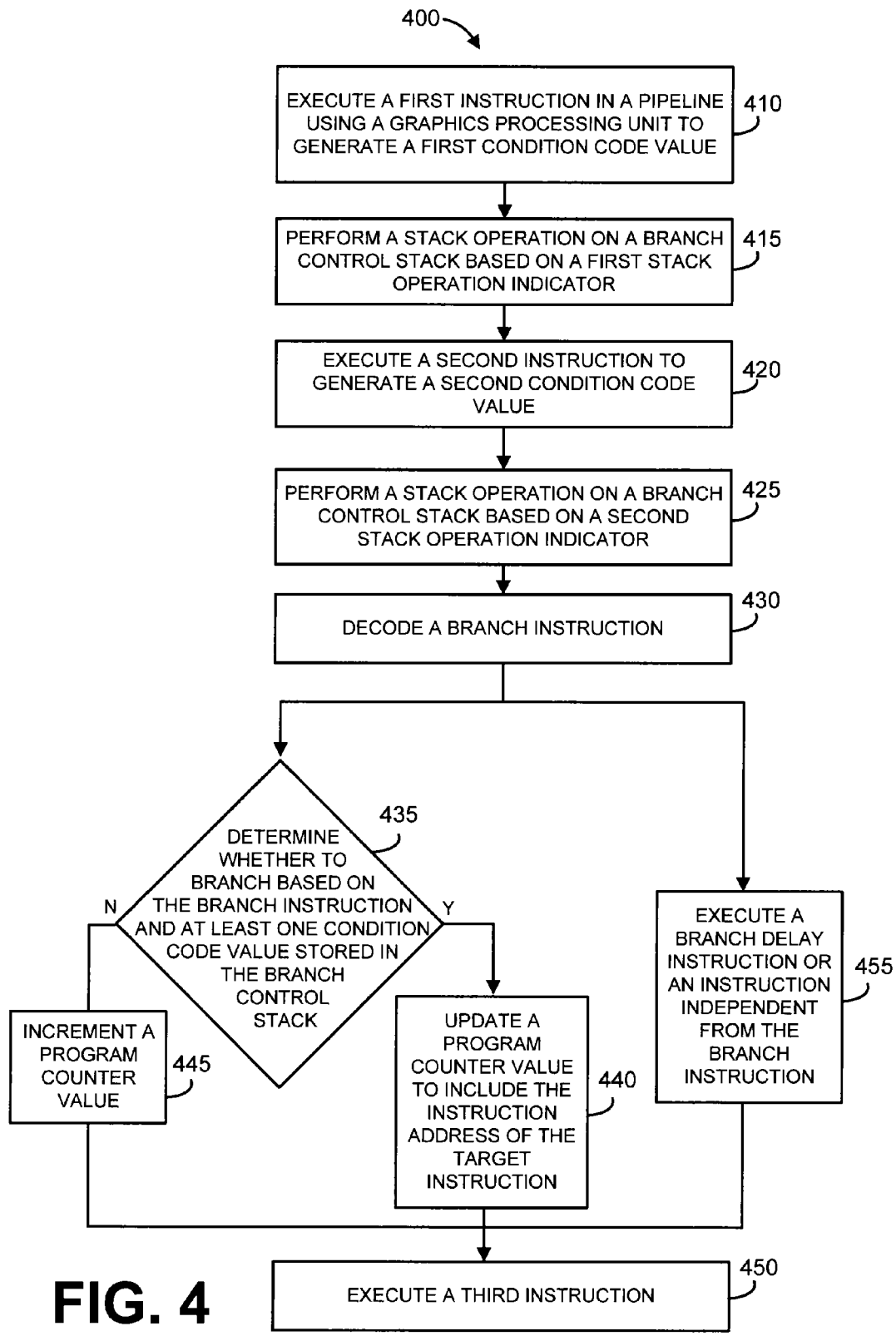
FIG. 4 is a flow chart illustrating an embodiment of a method of controlling the flow of instructions in the computing system illustrated in FIG. 1.
Figure 5:
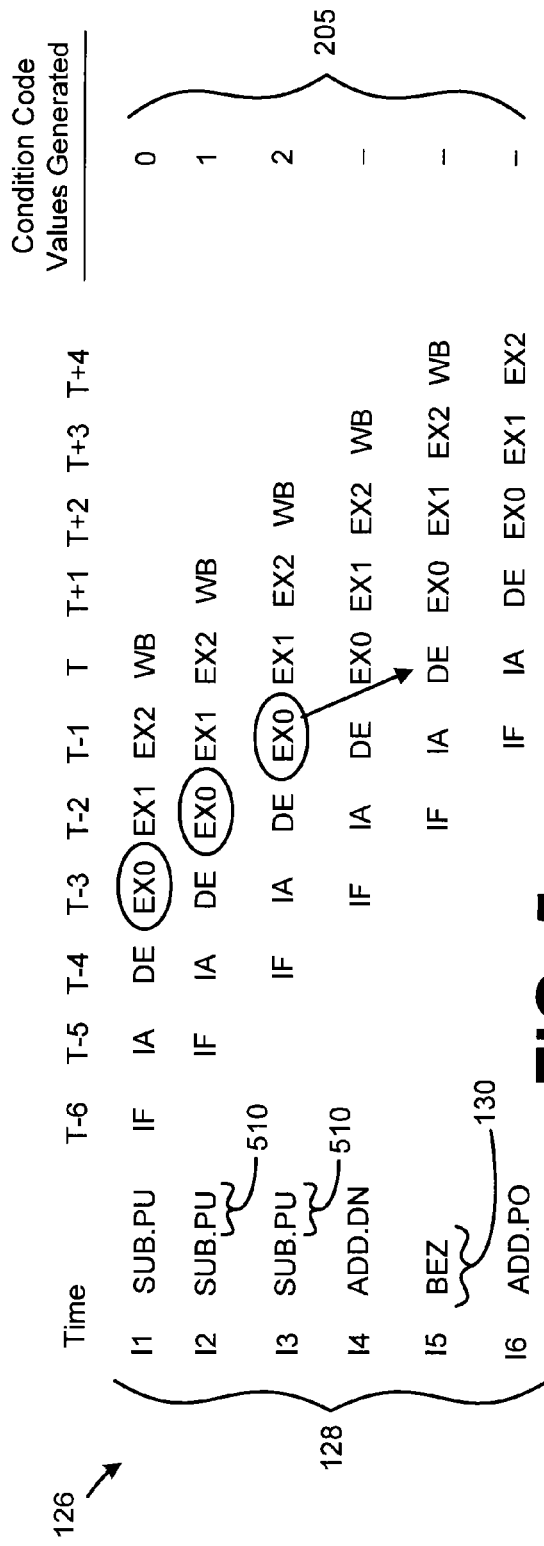
FIG. 5 is a block diagram illustrating a nonlimiting example of a program processed by the pipeline of the computing system illustrated in FIG. 1.
Figure 6:
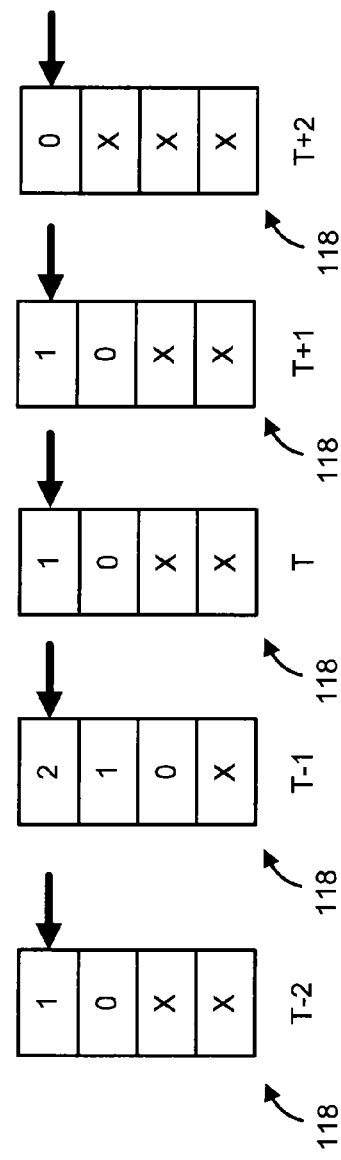
FIG. 6 is a block diagram illustrating a nonlimiting example of the contents of the stack versus time corresponding to FIG. 5.

FIG. 4 is a flow chart illustrating an embodiment of a method of controlling the flow of instructions 128 in the computing system 100 of FIG. 1. Also, FIG. 5 is a block diagram of nonlimiting example of a program 126 processed by the pipeline 112 of the computing system 100 of FIG. 1, and FIG. 6 is a block diagram of a nonlimiting example of the contents of stack 118 versus time that corresponds to FIG. 5. FIGS. 5 and 6 will be discussed in connection with FIG. 4 to further illustrate the method 400.

In block 410 of FIG. 4, a first instruction 128 is executed in a pipeline 112 using a GPU 110 to generate a first condition code value 205, which indicates the status of a branch condition. For example, in FIG. 5, a first instruction 128 (e.g., instruction I2) generates a condition code value 205 of "1" at time T-2 in the execution stage EX0. In this example, instruction I1 has already been executed, and a condition code value 205 of "0" was generated by instruction I1 and stored in the stack 118. The condition code values 205 each include four bits (e.g., CNVZ). However, to simplify the example, the condition code values 205 are expressed by numbers (e.g., "0," "1," "2," etc.).

Returning to FIG. 4, in block 415, a stack operation is performed on the stack 118 based on a stack operation indicator 510. As illustrated in FIG. 5, each instruction 128 includes a stack operation indicator 510, which include two bits that indicate whether and what kind of stack operation is to be performed on the stack 118 using the condition code value 205 generated by the instruction 128. Table 1 below illustrates an example of bit values for the stack operation indicator and the corresponding stack operations.

TABLE 1

Stack Operation Indicators and Corresponding Operations

| Stack Operation Indicator | Stack Operation |
|---|---|
| 00 | DN - Do Nothing (default) |
| 01 | PO - Pop the stack |
| 10 | PU - Push the condition code value onto the branch control stack |
| 11 | PP - Pop and then push the condition code value onto the branch control stack |

Accordingly, in block 415, the stack operation is performed on the stack 118 based on a stack operation indicator 510 of the first instruction 128 using the first condition code value 205 generated by the first instruction 128. As illustrated in FIG. 6, at time T-2, the first condition code value 205 of "1" is pushed according to the stack operation indicator 510 of instruction I1 onto the top of the stack 118. In some embodiments, at most two condition code values 205 may be popped from the stack 118 and one value pushed onto the stack 118 at any given cycle.

In block 420, a second instruction 128 is executed to generate a second condition code value. For example, in FIG. 5, a second instruction 128 (e.g., instruction I3) generates a condition code value 205 of "2" at time T-1 in the execution stage EX0. Then, in block 425, a stack operation is performed on the stack 118 based on a second stack operation indicator 510, which is the stack operation indicator 510 of the second instruction 128. Accordingly, in FIG. 6, the second condition code value 205 of "2" is pushed according to the stack operation indicator 510 of instruction I2 onto the top of the stack 118 at time T-1, and the first condition code value 205 of "1" is pushed to the second from top position in the stack 118.

In block 430, a branch instruction 130 is decoded at the decoding stage DE. Further, the two condition code values 205 stored at the top of the stack 118 are read as part of the decoding of the branch instruction 130. In the example illustrated in FIG. 5, instruction I4 (e.g., BEZ) is decoded at the decoding stage DE at time T. In general, there is at least one cycle between the condition code value being set and the branch instruction as illustrated in FIG. 5. In some embodiments, a branch instruction 130 includes a Boolean operation. Further in some embodiments, the branch instruction 130 is a compound conditional branch instruction 131, as will be discussed in further detail below.

In block 435, the GPU 110 determines whether to branch to the target instruction based on the decoded branch instruction 130 and at least on condition code value 205 stored in the branch control stack 118. Accordingly, the condition code values 205 read during the decoding of the branch instruction 130 in block 430 are used to determine whether to branch to the target instruction 128. In the example illustrated in FIG. 5, a determination whether to branch according to instruction I5 (e.g., BEZ (branch if equal to zero)) is made with regard to at least one of the condition code values 205 (e.g., "1" and "2") read during the decoding of instruction I5.

In block 440, when the determination in block 435 is to branch to the target instruction, a program counter value is updated to include the instruction address of the target instruction. In block 450, a third instruction 128 is executed, and when the determination in block 435 is to branch to the target instruction, the third instruction is the target instruction 128.

In block 445, when the determination in block 435 is to not branch to the target instruction, a program counter value is incremented. In block 450, a third instruction 128 is executed, and when the determination in block 435 is to not branch to the target instruction, the third instruction 128 is the next instruction 128 in sequence of the program 126.

In block 455, a branch delay instruction 132 or an instruction 128 that is independent from the branch instruction 130 is executed. During at least a portion of the time that the determination in block 435 and/or the changing of the program counter value in blocks 445 and 440 is occurring, the GPU 110 also executes a branch delay instruction (no-operation (NOP) instruction) 132 to keep the pipeline 112 processing instructions 128. In some embodiments, an instruction 128 that is independent from the branch instruction 130 is executed instead of the branch delay instruction 132 to increase the throughput of instructions 128 through the pipeline 112.

Since in a pipeline multiple instructions are executed at different stages 113, a branch instruction 130 may pass through several stages (hence, take several cycles) before the branch takes effect. To avoid executing the next instruction when a branch is pending, branch delay instructions may be included as inoperative instructions (NOPs) 132 that are executed in the pipeline 112 during those cycles.

Figure 7:
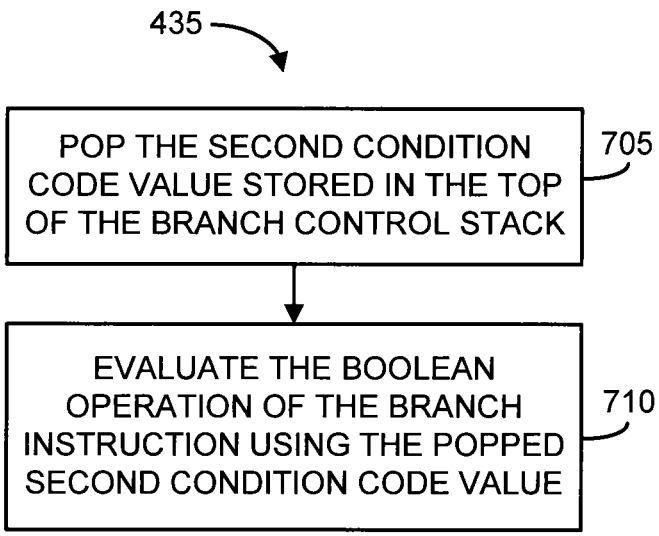
FIG. 7 is a flow chart illustrating an example of block 435 of the method illustrated in FIG. 4.

FIG. 7 is a flow chart describing an example of block 435 of the method 400 illustrated in FIG. 4 in further detail. Specifically, in block 705, the second condition code value 205 stored in the top of the stack 118 is popped off the top of the stack 118. Accordingly, in the example illustrated in FIGS. 5 and 6, the condition code value 205 of "2" (the condition code value 205 generated by instruction I2 at time T-2) is popped off the top of the stack 118 at time T, leaving the stack 118 having a contents of [1, 0, X, X].

In block 710, the Boolean operation of the branch instruction 130 is evaluated using the popped second condition code value 205. Referring to the example in FIGS. 5 and 6, the branch instruction 130 illustrated is a BEZ instruction, which indicates to branch if the condition code value is equal to zero. Since the popped second condition code value 205 is "2," which is not equal to zero, the program counter value will be incremented as specified in block 445 in FIG. 4.

Figure 8:
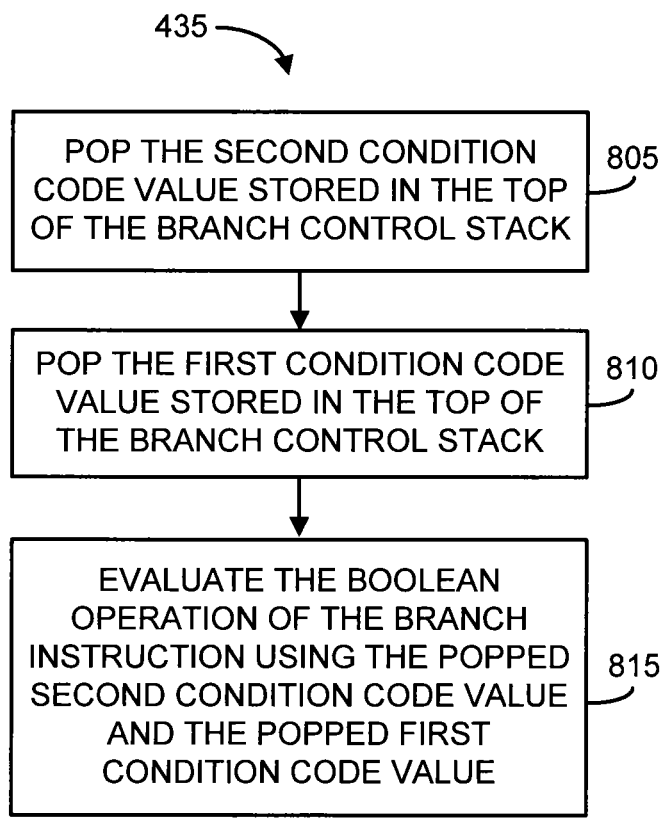
FIG. 8 is a flow chart illustrating another example of block 435 of the method illustrated in FIG. 4.

FIG. 8 is a flow chart describing another example of block 435 of the method 400 illustrated in FIG. 4 in further detail. Specifically, the example illustrated in FIG. 8 shows determining whether to branch based on a branch instruction 130 that is a compound conditional branch instruction 131. A compound conditional branch instruction 131 may cause a jump to a target instruction 128 depending upon whether two or more conditions are true. A compound conditional branch instruction 131 includes at least one Boolean operation for evaluating two condition code values 205 to determine whether the one or more conditions are true.

In block 805, the second condition code value 205 stored in the top of the stack 118 is popped off the top of the stack 118. Accordingly, the first condition code value 205 moves to the top of the stack 118. Then, in block 810, the first condition code value 205 is popped off the top of the stack 118. In block 815, the Boolean operation of the branch instruction 130 using the popped second condition code value 205 and the popped first condition code value 205.

In some embodiments, compound conditional branch instructions 131 are expressed in the form "CBfg.op." "fg" indicates the bits that the compound conditional branch instruction 131 selects from the two condition code value 205 stored at the top position of the stack 118. Each of the condition code values 205 includes four bits (e.g., CNVZ), and in some embodiments only the N and Z bits are selected by the compound conditional branch instruction 131.

Table 2 below illustrates the compound conditional branch instruction 131 variations and corresponding selected bits from the condition code values 205. In Table 2, "R" corresponds to a condition code value 205 at the top of the stack 118, and "S" corresponds to a condition code value 205 that is second from the top of the stack 118. Note that in the example described in FIGS. 5 and 6, "R" would correspond to the second condition code value 205, and "S" would correspond to the first condition code value 205.

TABLE 2

Bit Selection for Compound Conditional Branch Instructions

| Compound Conditional Branch Instruction | Selected Bits from the Condition code values |
|---|---|
| CBNN | Select the N bit for R and N bit for S. |
| CBNZ | Select the N bit for R and Z bit for S. |

TABLE 2-continued

Bit Selection for Compound Conditional Branch Instructions

| Compound Conditional Branch Instruction | Selected Bits from the Condition code values |
|---|---|
| CBZN | Select the Z bit for R and N bit for S. |
| CBZZ | Select the Z bit for R and Z bit for S. |

A Boolean operation is also indicated by compound conditional branch instructions 131 expressed in the form "CBfg.op." These operations are listed in Table 3 below, which describes an example of Boolean operations and corresponding bit codes. In Table 3, value "F" is the selected operand (bit) from the second condition code value 205 in the stack 118, and value "G" is the selected operand from the first condition code value 205 in the stack 118.

TABLE 3

Boolean Operations and Corresponding Bit Codes

| MINOR Coding | Op | F G | 0 0 | 0 1 | 1 0 | 1 1 |
|---|---|---|---|---|---|---|
| 0000 | AND | F & G | 0 | 0 | 0 | 1 |
| 0001 | FANDNG | F & ~G | 0 | 0 | 1 | 0 |
| 0010 | FAANDB | ~F & G | 0 | 1 | 0 | 0 |
| 0011 | NOR | NOR(F, G) | 1 | 0 | 0 | 0 |
| 0100 | OR | F \| G | 0 | 1 | 1 | 1 |
| 0101 | FORNG | F \| ~G | 1 | 0 | 1 | 1 |
| 0110 | NFORG | ~F \| G | 1 | 1 | 0 | 1 |
| 0111 | NAND | NAND(F, G) | 1 | 1 | 1 | 0 |
| 1000 | XOR | XOR(F, G) | 0 | 1 | 1 | 0 |
| 1001 | XNOR | XNOR(F, G) | 1 | 0 | 0 | 1 |

Figure 9:
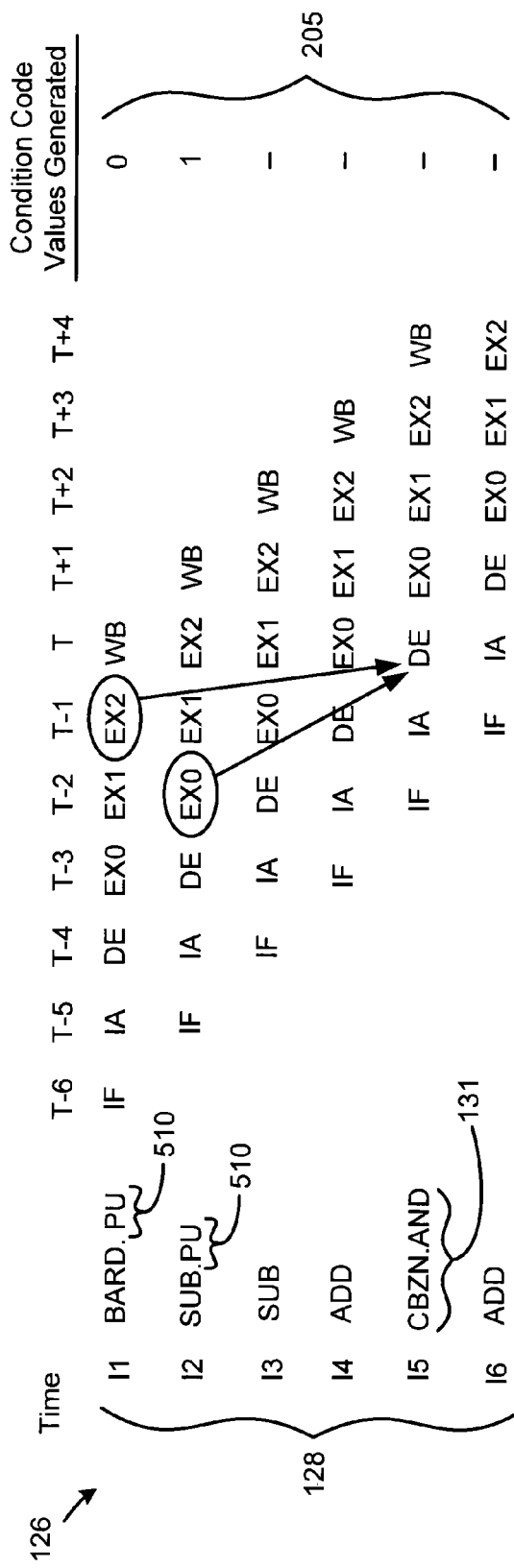
FIG. 9 is a block diagram illustrating a nonlimiting example of a program including a compound conditional branch instruction processed by the pipeline of the computing system illustrated in FIG. 1.
Figure 10:
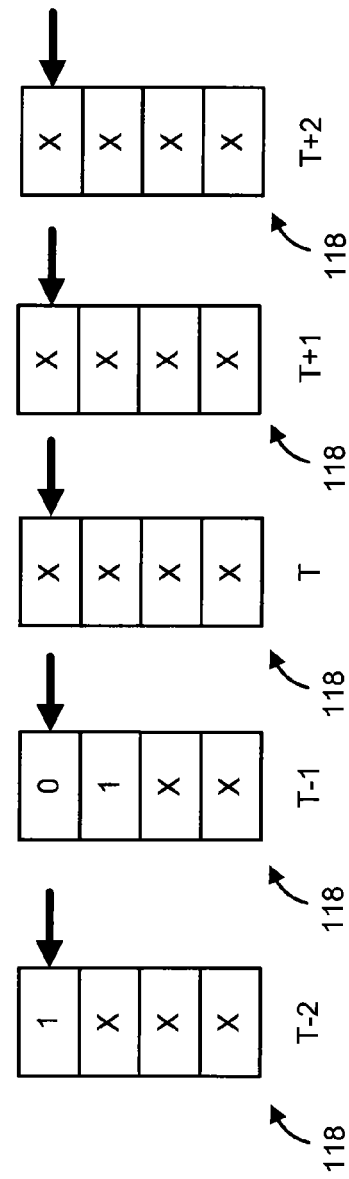
FIG. 10 is a block diagram illustrating a nonlimiting example of the contents of the stack versus time corresponding to FIG. 9.

FIG. 9 illustrates a program 126 being executed by a pipeline 112 according to the method 400 described in FIG. 4, and the program 126 includes a compound conditional branch instruction 131. FIG. 10 illustrates the contents of the stack 118 at different times corresponding to FIG. 9. The example illustrated in FIG. 9 includes a compound conditional branch instruction 131, namely instruction I5 (e.g., CBFG.AND). In this example, the logical operation in instruction I5 is:

(if OUTPUT(BARD)==1&& val<CONST) then
   operation

Turning to the method 400 described above, in accordance with block 410, a first instruction 128 (instruction I1) is executed that generates a first condition code value 205 of "0," as shown in the nonlimiting example of FIG. 9. Unlike the other instructions 128 described above, which generated a condition code value 205 in the first execution stage EX0, instruction I1(BARD.PU) generates a first condition code value 205 of "0" in the execution stage EX2 at time T-1, in this example. As illustrated in FIG. 10, the first condition code value 205 is pushed (as indicated by the stack operation indicator 510 included in instruction I1) onto the stack 118 at time T-1 in accordance with block 415 of FIG. 4.

Further, as described in block 420 of FIG. 4, a second instruction 128 (instruction I2) is executed that generates a second condition code value 205 of "1." However, instruction I2 (e.g., SUB.PU) generates a condition code value 205 in a first execution stage EX0 at time T-2. In other words, in this example, instruction I2 occurs after instruction I1 in the program 126, but instruction I2 generates a condition code value 205 of "1" before instruction I1 generates a condition code value 205 of "0." Hence, instruction I2 causes a condition code value 205 of "1" to be pushed onto the stack 118 at time T-2 in accordance with block 425 of FIG. 4, whereas instruction I2 causes a condition code value 205 of "0" to be pushed onto the stack 118 at time T-1 in accordance with block 415 of FIG. 4. Therefore, at time T-1, the stack 118 includes the condition code value 205 of "1" in the position second from the top of the stack 118 and the condition code value 205 of "0" at the top of the stack 118.

After instruction I2 is executed, instructions I3 (e.g., SUB) and I4 (e.g., ADD) are executed. Since no stack operation indicator 510 is included in the instructions I3 and I4, the default stack operation is do nothing (DN). Therefore, no condition code values 205 are pushed onto the stack 118 when instructions I3 and I4 are executed.

In accordance with block 430 of method 400, the compound conditional branch instruction 131 (e.g., CBZN.AND) is decoded at the decoding stage DE at time T. Consistent with blocks 805 and 810 of FIG. 8, the condition code values 205 at the top and second from the top positions in the stack 118 are popped off the stack 118 as illustrated in FIG. 10. Further, the popped condition code values 205 are used in determining whether to branch to a target instruction as described in block 815 of FIG. 8. Accordingly, in FIG. 10, at time T, the stack 118 shows that "0" and "1" have been popped off the stack 118.

Figure 11:
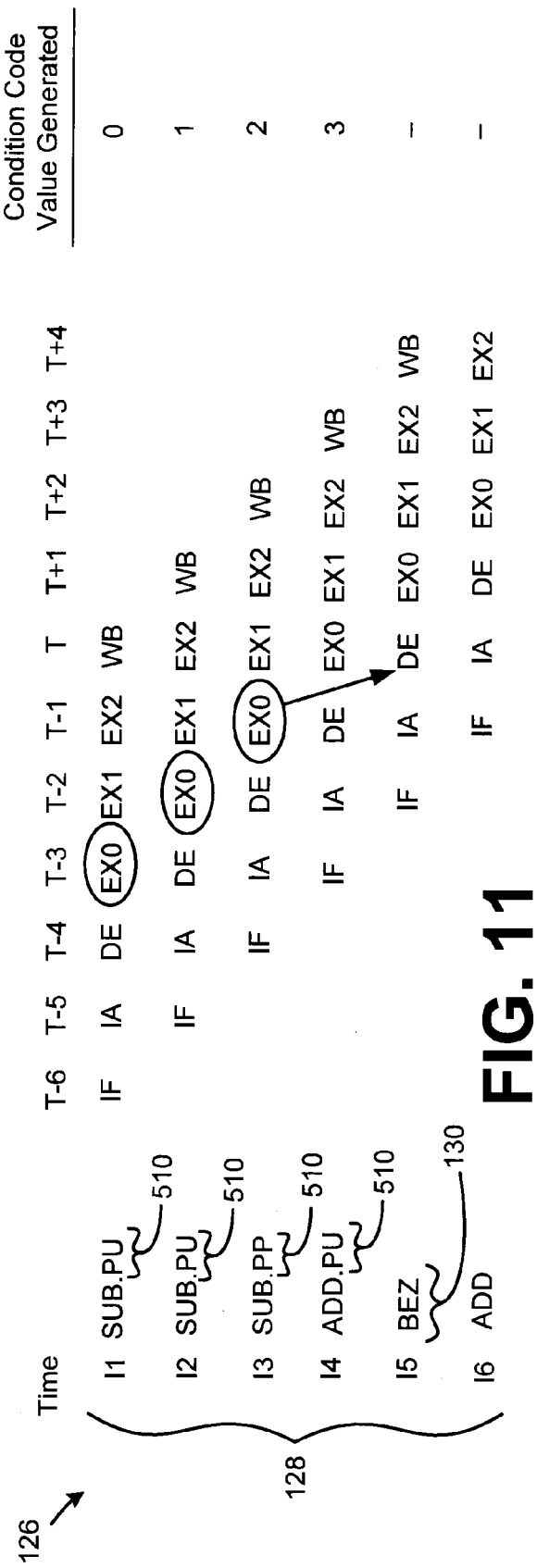
FIG. 11 is a block diagram illustrating a nonlimiting example of a program including a POP AND PUSH operation processed by the pipeline of the computing system illustrated in FIG. 1.
Figure 12:
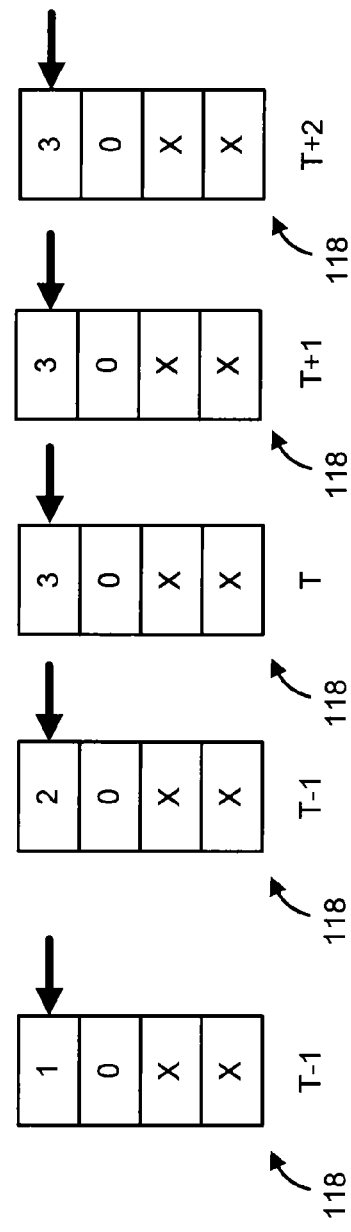
FIG. 12 is a block diagram illustrating a nonlimiting example of the contents of the stack versus time corresponding to FIG. 11.

Having incorporated a discussion of the stack operations POP and PUSH in the discussion of FIGS. 5, 6, 9 and 10 above, the stack operation POP AND PUSH of the stack 118 will now be described with respect to FIGS. 11 and 12. FIG. 11 is a block diagram illustrating a nonlimiting example of a program 126 including a POP AND PUSH operation processed by the pipeline 112 of the computing system 100 illustrated in FIG. 1, and FIG. 12 is a block diagram illustrating a nonlimiting example of the contents of the stack 118 versus time corresponding to FIG. 11.

In FIG. 11, instruction I3 (e.g., SUB.PP) includes a POP AND PUSH operation. As illustrated in FIG. 12, condition code values 205 of "0" and "1" have already been pushed onto the stack 118 in accordance with instructions I1 and I2. When instruction I3 is executed, a condition code value 205 of "2" is generated, and consistent with the stack operation indicator 510 (e.g., PP), the condition code value of "1" is popped off the stack 118 and the generated condition code value 205 of "2" is pushed onto the stack 118 at time T-1. At time T, the branch instruction 130 (e.g., instruction I5) is decoded in accordance with block 430 of FIG. 6, and the determination regarding whether to branch in block 435 is made using the condition code value of "2" at the top of the stack 118, which is popped off in accordance with block 705 of FIG. 7, since instruction I5 is not a compound conditional branch instruction 131. Further, instruction I4 (e.g., ADD.PU) generates a condition code value 205 of "3" at time T as well, and the condition code value 205 of "3" is pushed onto the stack 118 in accordance with the stack operation indicator 510.

The embodiments described above describe conditions for branch instructions 130 being evaluated at the decoding stage DE of a branch instruction 130. However, in some embodiments, the conditions for a branch instruction 130 are evaluated when the branch instruction 130 is at an execution stage EX0, EX1, EX2.

Figure 13:
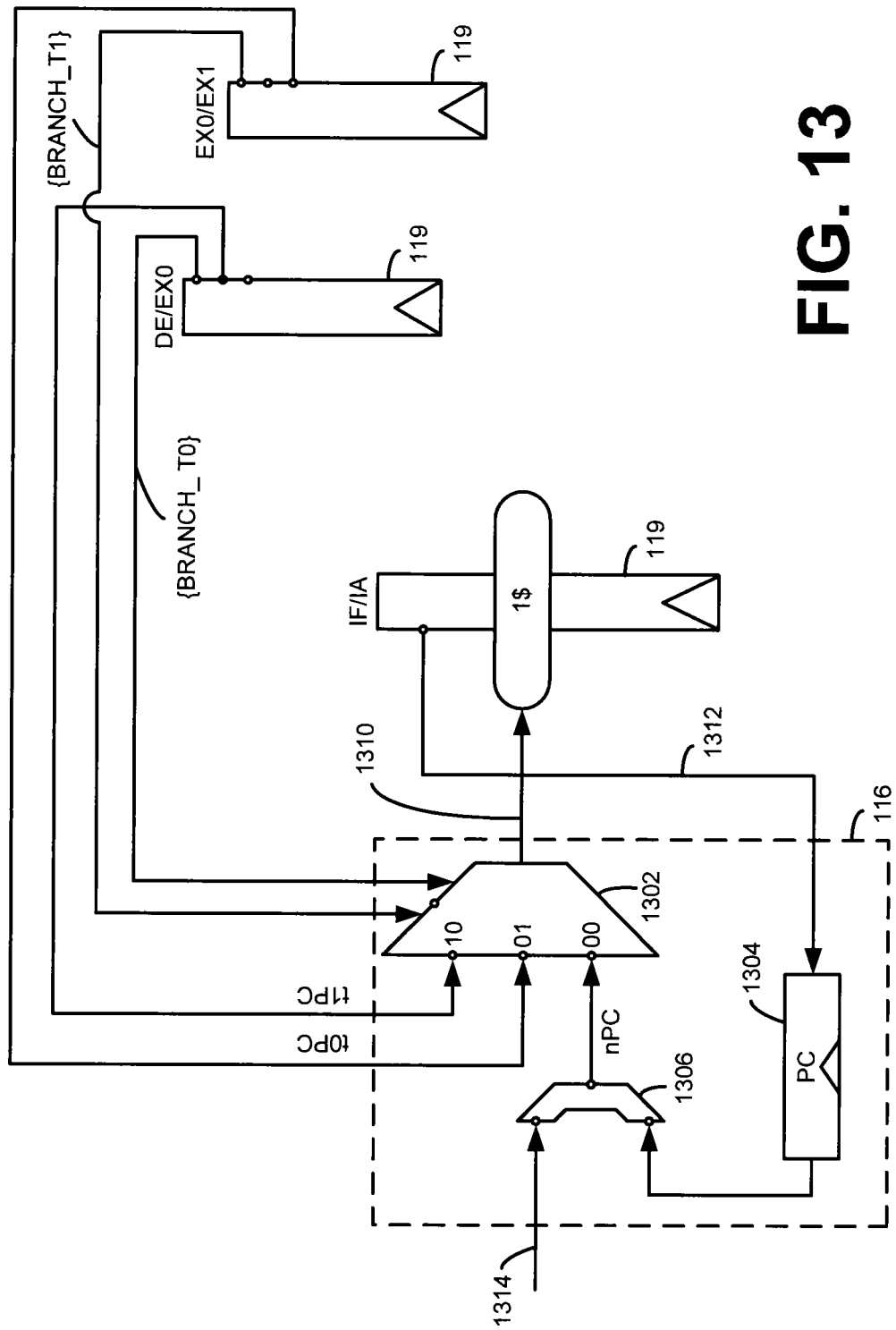
FIG. 13 is a block diagram illustrating a nonlimiting example of the flow controller of the computing system illustrated in FIG. 1.

FIG. 13 illustrates a nonlimiting example of the flow controller 116 of the computing system 100 shown in FIG. 1. The flow controller 116 determines whether a branch should occur after a particular stage 113. The embodiment illustrated in FIG. 13 illustrates a flow controller 116 configured to determine whether to branch after a decoding stage DE or after an execution stage EX0 based on a first branch indicator BRANCH_T0 and a second branch indicator BRANCH_T1.

The flow controller 116 receives as inputs the first branch indicator BRANCH_T0 and the second branch indicator BRANCH_T1 as inputs as well as a first target instruction address T0PC corresponding to a first target instruction 128 and a second target instruction address T1PC corresponding to a second target instruction 128 from the pipeline registers 119. Further, the flow controller 116 also receives an increment 1314 and the program counter value 1312 of the current instruction 128, 130.

The flow controller 116 stores the program counter value 1312 of the current instruction 128, 130 in a program counter register 1304, and the program counter value 1312 of the current instruction 128, 130 is sent from the program counter register 1304 to an adder 1306. The adder 1306 adds an increment 1314 (e.g., 4) to the program counter value 1312 to calculate the next instruction address NPC of the next instruction 128 in the program 126.

A multiplexor 1302 receives and selects between the first target instruction address T0PC, the second target instruction address T1PC, and the next instruction address NPC depending on the first branch indicator BRANCH_T0 and the second branch indicator BRANCH_T1. In a nonlimiting example, if a branch is to be taken after the decoding stage DE, BRANCH_T0 would have a logical value of "1" and BRANCH_T1 would have a logical value of "0." The program 126 is written so that both BRANCH_T0 and BRANCH_T1 would not both have a logical value of "1" because both branches could not be taken.

There are other programming issues that a person of skill in the art may consider when writing a program 126 that includes branch instruction 130 that utilize a stack 118 in a GPU 110. For example, the program 126 is to be written in such a way that prevents the stack 118 from underflowing or overflowing. In the case of overflow, the condition code values 205 stored at the bottom of the stack 118 will be lost, and in the case of underflow, the condition code values 205 retrieved from the stack 118 will be undefined. Simply put, the current contents of the stack 118 should be considered when writing each instruction 128, 130, 132.

As another example, the program 126 is to be written in such a way that avoids two or more instructions 128 generating condition code values during the same cycle that are also to be pushed onto the stack 118 during the same cycle. This issue can be addressed by storing one or more of the condition code values 205 that are generated in the same cycle in special registers.

In some embodiments, the control flow instructions may be expressed by the following pseudocode:

```
@ (DE){
    //copy the first two items on the stack at start of cycle
    COPY (branchstack [0], A);
    COPY (branchstack [1], B);
    IA.bop:= IR [3:0];
    {IA.popn}:= DECODE (IA. bop);
    bOffset := DECODE (IR);
    IF (operation == BTYPE) {
        nPC: = PC + bOffset;
        POP (IA.popn);
    }
}
@ (EX0) {
    EX0.CC: = OPERATION ( );
    CASE (EX0.CC) {
        DN: //do nothing
        PU: PUSH (EX0.CC);
        PO: POP ( );
        PP: POPPUSH (EX0.CC);
```

-continued

```
        }
    }
    @ (EX2) {
        EX2. CC: = OPERATION ( );
        CASE (EX2.CC) {
        DN: //do nothing
        PU: PUSH (EX2.CC);
        PO: POP ( );
        PP: POPPUSH (EX2.CC);
        }
    }
```

Any method descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method comprising:
executing a plurality of instructions in a multi-stage scalar pipeline using a graphics processing unit, one of the instructions generating a condition code value;
pushing the condition code value onto a branch control stack, the condition code value being generated during one of the stages of execution of one of the plurality of instructions in the scalar pipeline; and
processing a branch instruction, using a graphics processing unit, based at least in part on a condition code value read from the branch control stack, the condition code value being a first condition code value;
processing another one of the plurality of instructions in the scalar pipeline using the processing unit including generating a second condition code value; and
pushing the second condition code value onto a branch control stack, wherein the processing of the branch instruction is also based at least in part on the second condition code value read from the branch control stack.

2. The method of claim 1, wherein the second condition code value stored in the branch control stack is accessible by a pointer.

3. The method of claim 1, wherein the branch instruction is a compound conditional branch instruction including two or more logical operations.

4. The method of claim 1, wherein processing the branch instruction further comprises popping the condition code value off the branch control stack.

5. The method of claim 1, further comprising selecting between a target instruction address for branch to a target instruction after a decoding stage, a target instruction address for branch to a target instruction after an execution stage, and an program counter value increment, the selection being based on a first branch indicator and second branch indicator.

6. The method of claim 1, further comprising processing a branch delay slot after processing the branch instruction before a branch is performed.

7. A computing system comprising:
a memory storing a plurality of instructions; and
a graphics processing unit including a branch control stack comprising a set of condition registers, the graphics processing unit being configured to process the instructions according to a multi-stage scalar pipeline and store condition code values in the branch control stack, the graphics processing unit being further configured to process branch instructions using condition code values comprising at least a first condition code value and a second condition code value stored in the condition register at the top of the branch control stack, wherein the first condition code value and the second condition code value are generated by processing instructions in the scalar pipeline using the graphics processing unit, wherein processing of the branch instructions is based at least in part on the first condition code value and the second condition code value read from the branch control stack.

8. The method of claim 7, wherein the condition code value stored in the condition register at the top of the branch control stack is accessible by a pointer.

9. The computing system of claim 7, wherein the memory further includes a pipeline register after each stage of the multi-stage scalar pipeline, the computing system further comprising:
a flow controller configured to select between a target instruction address for branch to a target instruction after a decoding stage, a target instruction address for branch to a target instruction after an execution stage, and an program counter value increment.

10. The computing system of claim 9, wherein the selection is based on a first branch indicator stored in a first pipeline register and a second branch indicator stored in a second pipeline register.

11. A method comprising:
executing a first instruction at a first stage in a scalar pipeline using a graphics processing unit to generate a first condition code value, the first instruction including a first stack operation indicator;
performing a stack operation on a branch control stack based on the stack operation indicator;
decoding a branch instruction;
determining whether to branch to the target instruction based on the branch instruction and at least one condition code value stored in the branch control stack;
responsive to determining to branch to the target instruction, updating a program counter value to include the instruction address of the target instruction;
executing a second instruction to generate a second condition code value, the second instruction including a second stack operation indicator;
performing another stack operation on the branch control stack based on the second stack operation indicator;
popping the second condition code value stored in the top of the branch control stack;
popping the first condition code value stored in the top of the branch control stack, the first condition code value being popped after the second condition code value; and
evaluating the Boolean operation of the branch instruction using the second condition code value and the first condition code value.

12. The method of claim 11, further comprising incrementing a program counter value responsive to determining to not branch to the target instruction.

13. The method of claim 11, further comprising executing a branch delay instruction or an independent instruction is executed while the graphics processing unit increments the program counter value by an offset.

14. The method of claim 11, wherein the second condition code value is generated before the first condition code value is generated, the method further comprising storing the second condition code value in a register, and wherein the second condition code value is pushed onto the top position of the branch control stack and the first condition code value is moved to a second from the top position of the branch control stack.

15. The method of claim 14, wherein the first condition code value is generated during a stage of the pipeline that is different from the stage where the second condition code value is generated.

16. The method of claim 11, wherein the stack operation indicator indicates a stack operation selected from the group consisting of: pop operation, push operation, and pop and push operation.

17. The method of claim 11, further comprising:
    calculating an offset for a target instruction; and
    wherein updating a program counter value to include the instruction address of the target instruction further includes adding the offset to the program counter value.

* * * * *